(12) United States Patent
Geng

(10) Patent No.: US 6,700,669 B1
(45) Date of Patent: Mar. 2, 2004

(54) METHOD AND SYSTEM FOR THREE-DIMENSIONAL IMAGING USING LIGHT PATTERN HAVING MULTIPLE SUB-PATTERNS

(75) Inventor: Zheng J. Geng, 11001 Sugarbush Ter., Rockville, MD (US) 20852

(73) Assignee: Zheng J. Geng, Rockville, MD (US)

( * ) Notice: Subject to any disclaimer, the term of this patent is extended or adjusted under 35 U.S.C. 154(b) by 373 days.

(21) Appl. No.: 09/771,531

(22) Filed: Jan. 29, 2001

Related U.S. Application Data

(60) Provisional application No. 60/178,695, filed on Jan. 28, 2000.

(51) Int. Cl.[7] .......................... G01B 11/24; G01B 11/30; G01B 11/25
(52) U.S. Cl. .................. 356/603; 356/602; 356/610
(58) Field of Search .......................... 353/7, 42, 8, 28, 353/29, 64, 70; 356/147, 121, 123, 188, 622, 623, 603, 602, 601, 604, 610

(56) References Cited

U.S. PATENT DOCUMENTS

| 4,648,717 A | * | 3/1987 | Ross et al. ................ 356/610 |
| 5,675,407 A | * | 10/1997 | Geng .......................... 356/147 |
| 6,028,672 A | * | 2/2000 | Geng .......................... 356/602 |
| 6,147,760 A | * | 11/2000 | Geng .......................... 356/602 |
| 6,252,623 B1 | * | 6/2001 | Lu et al. ...................... 348/47 |
| 6,341,016 B1 | * | 1/2002 | Malione ...................... 356/603 |

* cited by examiner

*Primary Examiner*—Russell Adams
*Assistant Examiner*—Andrew Sever
(74) *Attorney, Agent, or Firm*—Steven L. Nichols; Paul W. Fish; Rader, Fishman & Grauer PLLC

(57) ABSTRACT

A three-dimensional imaging method and system illuminates an object to be imaged with a light pattern that is formed from two or more light sub-patterns. The sub-patterns can each encompass the visible light spectrum or can be spatially varying intensity sub-patterns that each correspond to a red, green, or blue component. The light pattern is generated by a slotted planar member or an optical filter.

43 Claims, 8 Drawing Sheets

X  =

Projected Illumination Pattern    Image Sensor Characteristics    Pattern on the Received Image Multi-Rainbow Projection Pattern Projection Angle v.s. Wavelength

METHOD AND SYSTEM FOR THREE-DIMENSIONAL IMAGING USING LIGHT PATTERN HAVING MULTIPLE SUB-PATTERNS

REFERENCE TO RELATED APPLICATIONS

This application claims the benefit of U.S. Provisional Appln. No. 60/178,695, filed Jan. 28, 2000, the disclosure of which is incorporated herein by reference in its entirety.

BACKGROUND OF THE INVENTION

1. Field of the Invention

The present invention is directed to three-dimensional surface profile imaging, and more particularly to a method and apparatus for three-dimensional imaging that uses color ranging to conduct surface profile measurement.

2. Description of the Related Art

A three dimensional surface profile imaging method and apparatus described in U.S. Pat. No. 5,675,407 ("the '407 patent"), the disclosure of which is incorporated herein by reference in its entirety, conducts imaging by projecting light through an optical filter, such as linear variable wavelength filter (LVWF), thereby projecting light having a known, spatially distributed wavelength spectrum on the objects being imaged. The LVWF is a rectangular optical glass plate coated with a color-filtering film that gradually varies in color, (i.e., wavelength). If the color spectrum of a LVWF is within the visible light region, one edge of the filter rectangle may correspond to the shortest visible wavelength (i.e. blue or violet) while the opposite edge may correspond to the longest visible wavelength, (i.e. red). The wavelength of light passing through the coated color-filtering layer is linearly proportional to the distance between the position on the filter glass where the light passes and the blue or red edge. Consequently, the color of the light is directly related to the angle θ, shown in FIG. 1, at which the light leaves the rainbow projector and LVWF.

Referring to FIG. 1 in more detail, the imaging method and apparatus is based on the triangulation principle and the relationship between a light projector 100 having the LVWF, a camera 102, and the object being imaged 104. As shown in FIG. 1, a triangle is uniquely defined by the angles theta (θ) and alpha (α), and the length of the baseline (B). With known values for θ, α, and B, the distance (i.e., the range R) between the camera 102 and a point Q on the object's surface can be easily calculated. Because the baseline B is predetermined by the relative positions of the light projector 100 and the camera 102, and the value of α can be calculated from the camera's geometry, the key to the triangulation method is to determine the projection angle, θ, from an image captured by the camera 102 and more particularly to determine all θ angles corresponding to all the visible points on an object's surface in order to obtain a full-frame 3D image in one snapshot.

FIG. 2 is a more detailed version of FIG. 1 and illustrates the manner in which all visible points on the object's surface 104 is obtained via the triangulation method. As can be seen in the Figure, the light projector 100 generates a fan beam of light 200. The fan beam 200 is broad spectrum light (i.e., white light) which passes through the LVWF to illuminate one or more three-dimensional objects 104 in the scene with a pattern of light rays possessing a rainbow-like spectrum distribution. The fan beam of light 200 is composed of multiple vertical planes of light, or "light sheets", each plane having a given projection angle and wavelength. Because of the fixed geometric relationship among the light source 102, the lens of the camera 102, and the LVWF, there exists a one-to-one correspondence between the projection angle (θ) of the vertical plane of light and the wavelength (λ) of the light ray. Note that although the wavelength variations are shown in FIG. 2 to occur from side to side across the object 104 being imaged, it will be understood by those skilled in the art that the variations in wavelength could also be made from top to bottom across the object 104 being imaged.

The light reflected from the surface of the object 104 is then detected by the camera 102. If a visible spectrum range LVWF (400–700 nm) is used, the color detected by the camera pixels is determined by the proportion of its primary color Red, Green, and Blue components (RGB). The color spectrum of each pixel has a one-tone correspondence with the projection angle (θ) of the plane of light due to the fixed geometry of the camera 102 lens and the LVWF characteristics. Therefore, the color of light received by the camera 102 can be used to determine the angle θ at which that light left the rainbow light projector. Other spectrum ranges can also be used in similar fashion. The implementation is straightforward to those skilled in the art.

As described above, the angle a is determined by the physical relationship between the camera 102 and the coordinates of each pixel on the camera's imaging plane. The baseline B between the camera's 102 focal point and the center of the cylindrical lens of the light projector 100 is fixed and known. Given the value for angles α and θ, together with the known baseline length B, all necessary information is provided to easily determine the full frame of three-dimensional range values (x,y,z) for any and every visible spot on the surface of the objects seen by the camera 102.

As shown in FIG. 3, given the projection angle θ, the three-dimensional algorithm for determining the (x,y,z) coordinates of any surface spot Q(x,y,z) on a three-dimensional object is given below based on the following triangulation principle:

$$x = \frac{B}{f*ctg\theta - u}*u, \quad y = \frac{B}{f*ctg\theta - u}*v, \quad z = \frac{B}{f*ctg\theta - u}*f \quad (1)$$

As a result, the three dimensional imaging system described above can capture full-frame, high spatial resolution three-dimensional images using a standard camera, such as a charge coupled device camera, in real time without relying on any moving parts. Further, because the imaging system does not rely on a laser, it does not pose any hazard to the eyes when used in clinical applications. Also, because the wavelength of the light projected onto the object surface continuously varies, there is no theoretical limitation on the measurement accuracy that can be achieved by the system. The actual accuracy of a specific system will depend on system implementation and will be affected primarily by limiting factors such as the optical system design, the quality and resolution of the camera, light spectral emission of the light source projector; noise level and resolution of the frame grabber, calibration algorithms, and the three-dimensional imaging processing algorithms.

To avoid allowing the ambient light on the object being imaged from affecting the imaging results, the system may obtain an image of the object under normal light conditions before projecting the filtered light onto the object. The image obtained under normal light conditions is then subtracted from the image obtained under LVWF light conditions to eliminate the effects of the ambient light on the image.

Referring back to FIG. 1, the triangulation algorithm used in the imaging system is based on the following formula, with reference to FIG. 3:

$$R = \frac{\sin\theta}{\sin\alpha}B, \quad (2)$$

where $(x_p, y_p)$ is the location of the rainbow light projector, $(x_c, y_c)$ is the location of imaging sensor, B is the baseline between the rainbow projector and the imaging sensor (CCD), $\alpha = \pi - \theta - \beta$, O is a surface point on the object in the scene, and R is the three-dimensional range, that is, the distance between $(x_c, y_c)$ and O.

Note that all of the variables, $\theta$, $\alpha$, and $\beta$, in the equation 10 may introduce error in the three-dimensional range calculation. In the following error sensitivity analysis, considered with reference to FIG. 4, it is assumed that the coordinate of the camera's focal point in the world coordinate system can be obtained precisely through camera calibration. The full derivative of the R is given by:

$$dR = \left[\frac{\sin\theta\cos\alpha}{-\sin^2\alpha}b\right]d\alpha + \left[\frac{\cos\theta}{\sin\alpha}b\right]d\theta + \left[\frac{\sin\theta}{\sin\alpha}\right]db \quad (3)$$

The $d\alpha$, $d\theta$, and $db$ are all functions of the position error of the light projector ($dx_p$, $dz_p$) and the color mismatch $dx$. Notice that:

$$b = \sqrt{(x_c - x_s)^2 + (z_c - z_s)^2}, \quad (5)$$

$$\beta = -\tan^{-1}\frac{z_c - z_p}{x_c - x_p} + \tan^{-1}\frac{z_c}{x_c - x}, \quad \text{and}$$

$$= \tan^{-1}\frac{z_c - z_p}{x_c - x_p} + \tan^{-1}\frac{z_p}{x - x_p}$$

Therefore $$db = \frac{(x_p - x_c)dx_p + (z_p - z_c)dz_p}{b} \quad (5)$$

$$d\beta = \frac{(x_{cf} - x_p)dz_p + (z_p - z_c)dx_p}{b^2}$$

$$d\theta = \frac{(x_p - x_c)dz_p + (z_c - z_p)dx_p}{b^2} - \frac{z_p}{(x - x_p)^2 + z_p^2}dx$$

To simplify the analysis, the effect of a mismatch error in the world coordinate, dx, caused by imaging sensor's spectral noise can be indicated as follows:

$$dR = \left[\frac{\cos\theta}{\sin\alpha}b\right]\frac{z_p}{(x - x_p)^2 + z_p^2}dx \quad (6)$$

The linear relationship between the mismatch error dx in the world coordinate and the mismatch error in CCD camera's pixel coordinate, di, allows approximation of dx and di as if they are the same order of magnitude, resulting in the expression:

$$dx = k * di \quad (7)$$

where k is a constant. From this expression, the range error in terms of the color mismatch error in CCD pixel coordinate can be expressed as follows:

$$dR = \left[\frac{\cos\theta}{\sin\alpha}b\right]\frac{z_p}{(x - x_p)^2 + z_p^2} * k * di \quad (8)$$

In the imaging system shown in FIGS. 1 and 2, the continuously varying wavelength pattern obtained via the light projector 100 and the LVWF 101 is projected spatially onto surfaces of a three-dimensional object or scene 104. There is a one-to-one corresponding relationship between the wavelength of the projected light sheet, $\omega$, and its projection angle, $\theta$. Based on this one-to-one relationship, a $(\omega,\theta)$ lookup table can be established for the color matching operation. An image sensor device (such as the CCD camera 102) that collects the reflection from object's surfaces also provides wavelength information for each pixel in an image, enabling the determination of the projection angle $\theta$ corresponding to each image pixel through the color matching operation based on the $(\omega,\theta)$ lookup table.

The accuracy of the color match operation, of course, affects the accuracy of the three-dimensional surface measurement. Referring to FIG. 5, the accuracy of the color match is significantly determined by the characteristics of the projected wavelength-varying illumination pattern. More particularly, the system has a signal to noise ratio (S/N=c), where the noise is a catch-all term that characterizes all undesirable effect in the system to reduce the fidelity of the spectral signal (i.e., wavelength). Due to the existence of the noise, mismatch error (denoted as dw) occurs.

As shown in FIG. 6, for the same magnitude level of dw, if we use a spatially varying projection pattern that has a greater derivative, a smaller mismatch error in the pixel coordinate, denoted as di, occurs due to the increased slope caused by the larger derivative:

$$di_2 < di_1. \quad (9)$$

Using Equ. (8) in Equ. (9), the expression becomes:

$$dR_2 < dR_1. \quad (10)$$

The above expressions suggest that mismatch errors can be reduced by using a spatially varying projection pattern that has a large variation rate and therefore a large derivative.

As noted above, the imaging system projects a light pattern that could be described as a "single rainbow projection" pattern because the pattern ranges over the visible light spectrum a single time. This type of pattern, however, has a variation rate that depends on numerous factors, including the field of view of the camera/image sensor, the distance between the light projector and the object being imaged, as well as other factors. As a result, it is difficult to adjust the spectral variation rate of the single rainbow projection pattern to fit the accuracy requirements of many three-dimensional imaging tasks.

There is a need for a method and system that can optimize the light pattern to provide higher measurement accuracy.

SUMMARY OF THE INVENTION

Accordingly, the present invention is directed to a system and method that generates a light pattern that contains multiple cycles of light spectra or sub-patterns. In one embodiment, the light pattern includes two or more cycles of spectra of visible or infrared light, arranged contiguously with each other. The light pattern may also be generated by sequentially emitting two or more sub-patterns.

In another embodiment of the invention, the multiple spectra light pattern is generated by projecting the light from the light source through a planar member, such as a slotted panel, that is movable to generate small phase shifts in the light pattern. The multiple patterns and/or sub-patterns used to illuminate the object being imaged improves resolution and measurement accuracy by reducing color mismatch error.

DETAILED DESCRIPTION OF THE PREFERRED EMBODIMENTS

Figure 1:
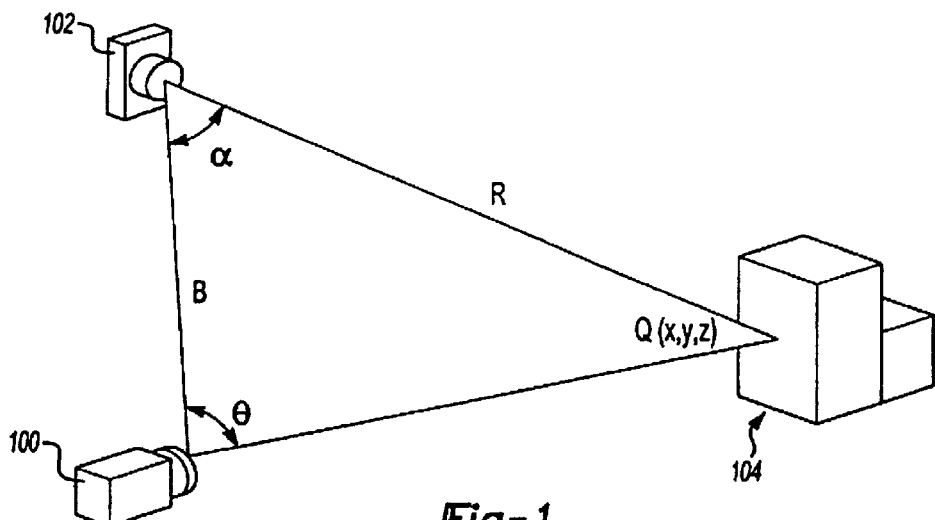
FIG. 1 is a simplified diagram illustrating a triangulation principle used in the present invention.
Figure 2:
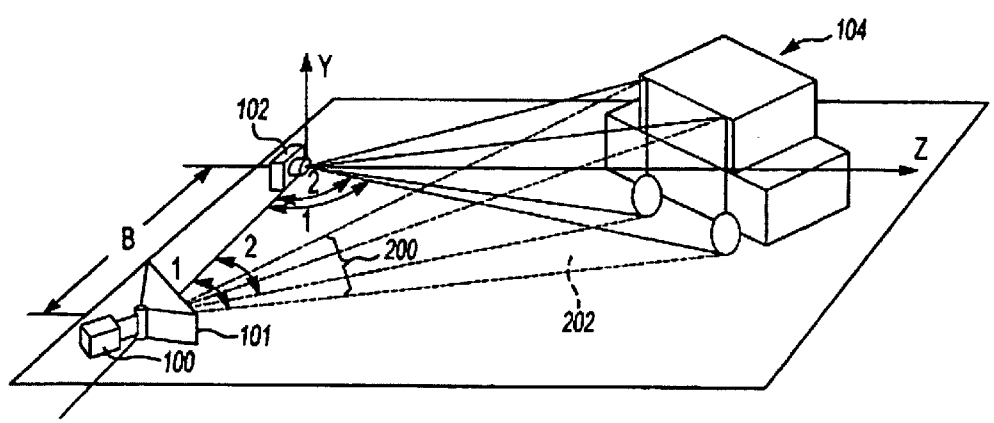
FIG. 2 is a representative diagram of the components used by the inventive system.
Figure 3:
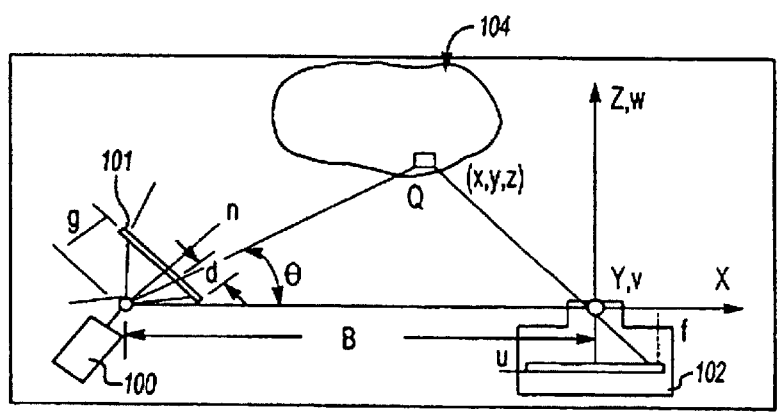
FIG. 3 is a plan view of the system shown in FIG. 2.
Figure 4:
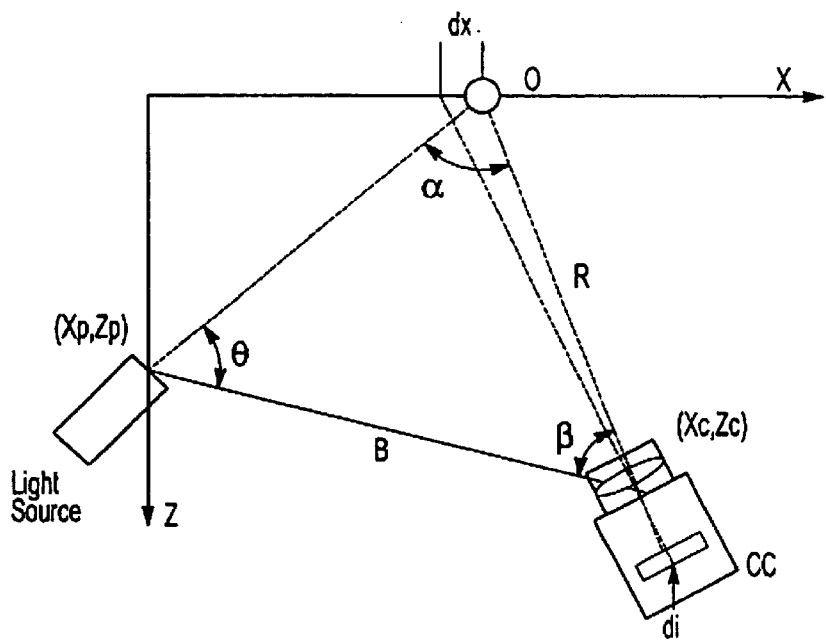
FIG. 4 is a representative diagram illustrating the effect of errors in range calculation.
Figure 5A:
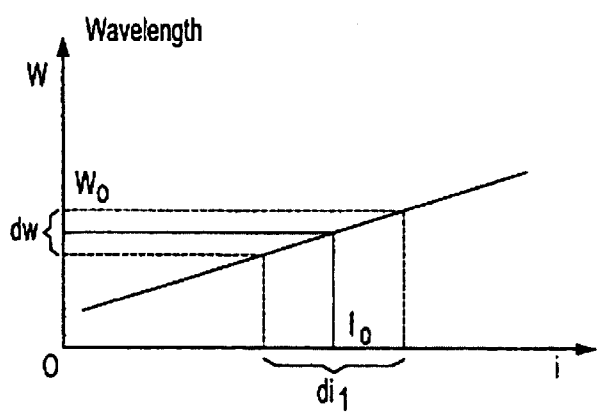
FIGS. 5a and 5b are graphs comparing the slopes of the illumination pattern on measurement accuracy.
Figure 5B:
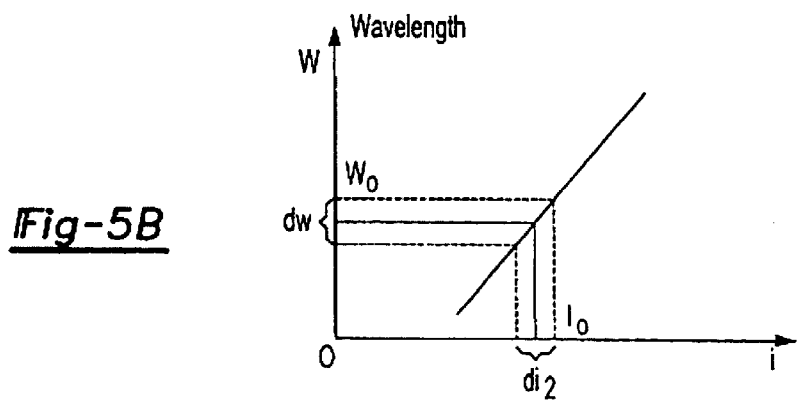
Figure 6A:
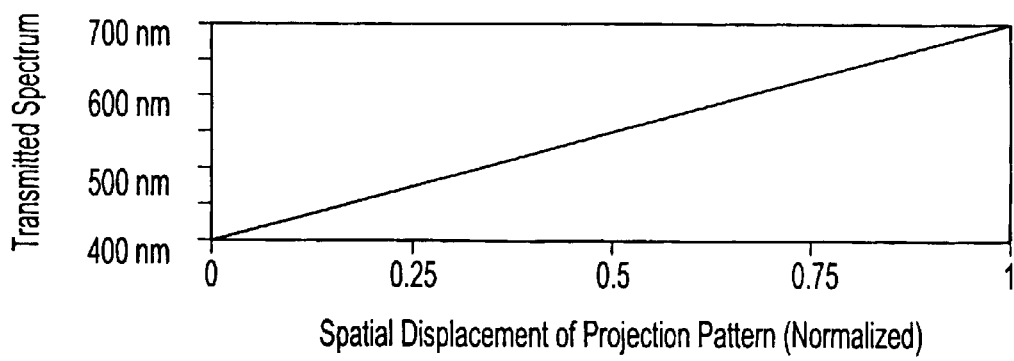
FIGS. 6a and 6b are light pattern spatial displacement graphs corresponding to one embodiment of the present invention.
Figure 6B:
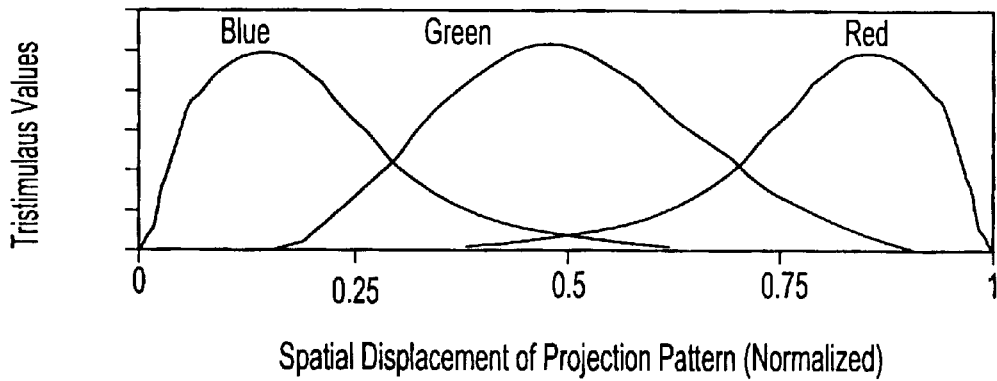

FIGS. 6a and 6b illustrate one manner in which the light projection pattern can be modified to improve resolution and measurement accuracy. FIGS. 6a and 6b assume that the light pattern is a single rainbow projection pattern. As explained above, the light pattern contains red, green and blue (RGB) components. In one embodiment of the invention, the intensities of the RGB components in the light pattern are modulated so that the intensity of each R, G, B component varies between high and low points, i.e. from a peak to a valley, and forms multiple cycles of pattern variation. The locations of the peak-valley points for the R, G, and B sub-patterns are spread over the spatial period of the light pattern, as shown in FIG. 6b. Notice that the distribution of R, G, and B does not need to be evenly spaced across the spatial period.

Because this embodiment uses a single rainbow projection pattern as the light pattern, the one-to-one correspondence between the wavelength of a light sheet in the light pattern and its projection angle still applies in this embodiment.

Figure 7A:
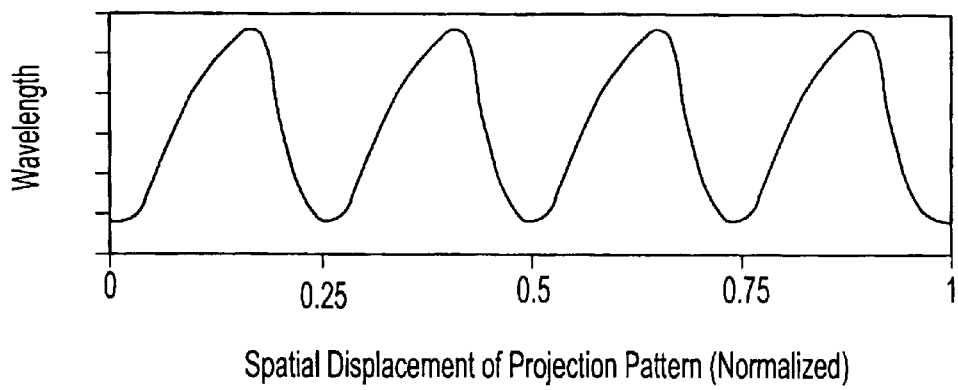
FIGS. 7a, 7b and 7c illustrate a multiple spectra light projection pattern according to the present invention.
Figure 7B:
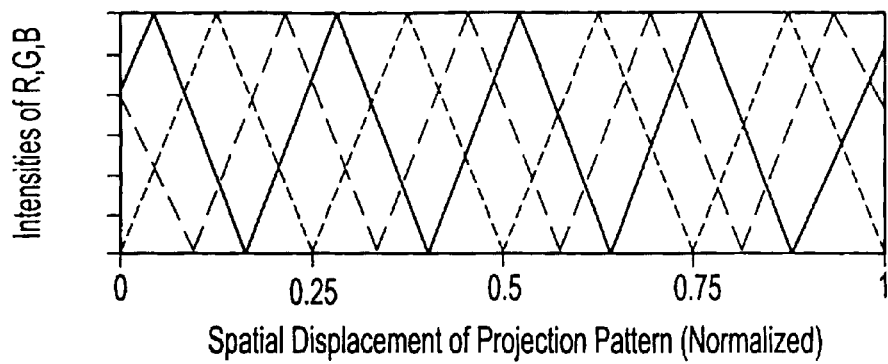
Figure 7C:
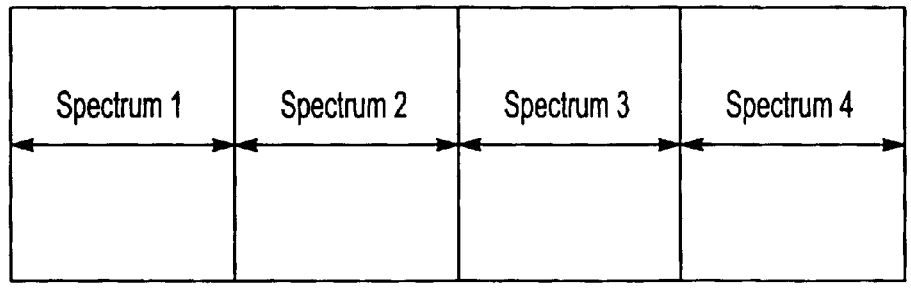

Referring now to FIGS. 7a through 7c, the light pattern from the light projector does not have to be limited to a single spectrum, where a one-to-one correspondence between a given wavelength and a given projection angle applies. Instead, the light pattern may include multiple cycles of spectra, such as multiple visible light spectra, such that a given wavelength from the light projector could be generated and transmitted in several projection directions, i.e. at several projection angles. This will be referred to as a "multiple rainbow projection" pattern, even though the spectra is not limited to the visible rainbow light spectrum. Because a given wavelength will no longer have a one-to-one correspondence with a projection angle, the look-up table will contain two or more projection angles for each wavelength (a one-to-many relationship). As a result, the multiple rainbow projection system requires an additional procedure to select the correct projection angle for a given wavelength.

Figure 8:
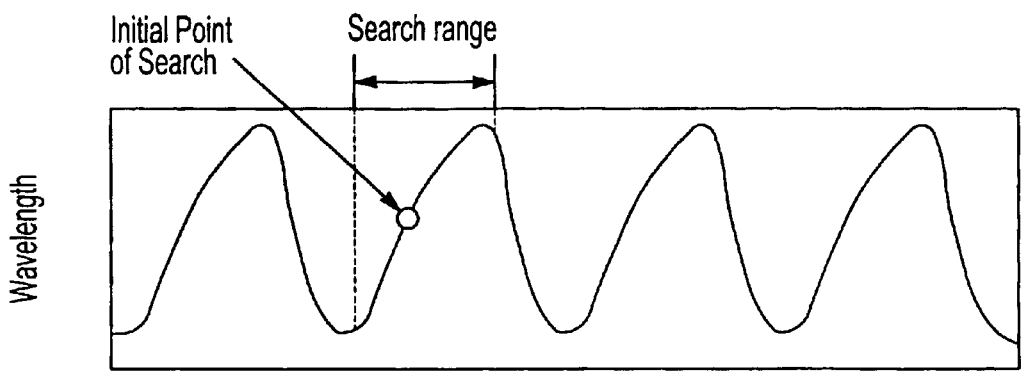
FIG. 8 is a representative diagram of the manner in which a point search is conducted for the multiple spectra light projection pattern.
Figure 9:
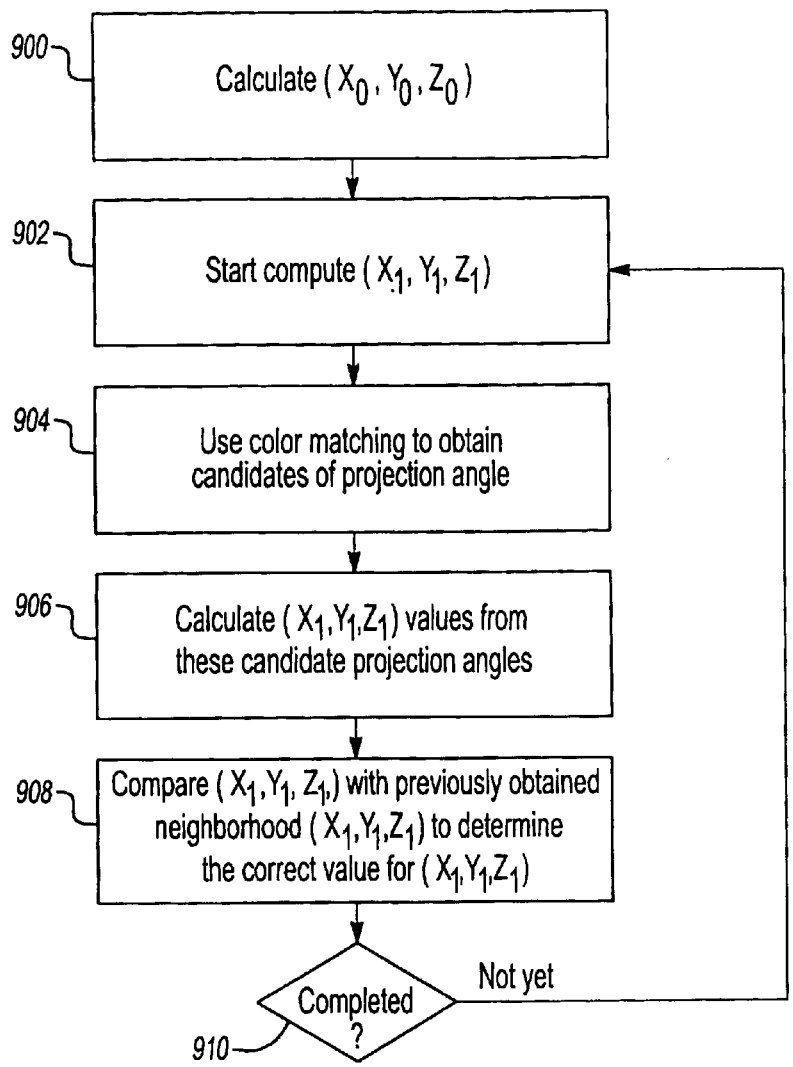
FIG. 9 is a flowchart of an adaptive initial point calculation method used in the present invention.

FIGS. 8 and 9 is a graph and flowchart, respectively, outlining the procedure for conducting color matching for a one-to-many lookup table that contains multiple projection angles for a given wavelength. To avoid any mismatching from an incorrect projection angle selection, the method shown in FIG. 9 can be used to reduce any ambiguities.

First, adaptive control can be used to determine the initial condition in the search. More particularly, an adaptive initial point calculation mechanism may be used to ensure that the initial point at which the iterative search method begins is at least somewhat close to the correct result, particularly because the final result of iterative processes tends to depend on the selected initial condition. By limiting the search range, as shown in FIG. 8, within one spectrum in the multiple-spectrum light pattern, the likelihood of a correct color match is greatly increased.

One method of increasing the chance for having a good initial point in a search is to use an adaptive initial point calculation mechanism. The initial point of the search is determined by a correct match point in the search of a neighboring pixel. The underlying assumption here is that most portions of the surface of a physical object being imaged are continuous. Thus the projected, i.e., reflected, color is similar for neighboring portions of the object, and therefore the initial projection angle value should also be very similar.

As can be seen in FIG. 9, the process starts by determining origin point coordinates $(x_0, y_0, z_0)$ at step 900. This point can be, for example, the upper right-hand pixel in the image. To compute the correct value for the desired point $(x'_i, y'_i, z'_i)$ at step 902, the inventive system uses color matching to obtain projection angle candidates at step 904. For example, if the object is being illuminated with two identical rainbow spectra are arranged horizontally, i.e., right and left, with respect to each other, it can be assumed that the light resulting in the upper right-hand pixel of the image taken results from light in the right-hand spectrum as reflected by the object. Therefore, to identify the angle at which that light was originally emitted, θ, the wavelength of that light is matched to the angle at which that wavelength is being emitted in the right-hand, as opposed to the left-hand, rainbow spectrum. Once this angle is identified, the value for $(x'_i, y'_i, z'_i)$ obtained at step 906 is compared with previously obtained neighborhood point $(x_{i-1}, y_{i-1}, z_{i-1})$ to determine the correct value for $(x_i, y_i, z_i)$ at step 908. If the iteration process is determined to be complete at step 910, then the process ends. Otherwise, another iteration is conducted to refine the determination of the value of $(x_i, y_i, z_i)$.

Note that although the look-up table for a multiple rainbow projection system has multiple projection angles associated with any given wavelength when the light pattern is viewed as a whole, the system restricts the search space in the color matching operation within a smaller range (e.g., within one sub-pattern) so that, as a practical matter, there is a one-to-one correspondence between the wavelength and the projection angle when the search is restricted to within the sub-pattern.

Figure 10A:
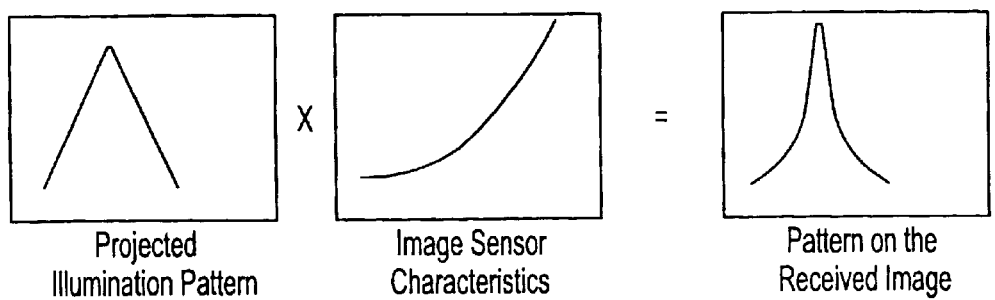
FIGS. 10a and 10b are diagrams illustrating the effect of sensor characteristics on light pattern distortion.
Figure 10B:
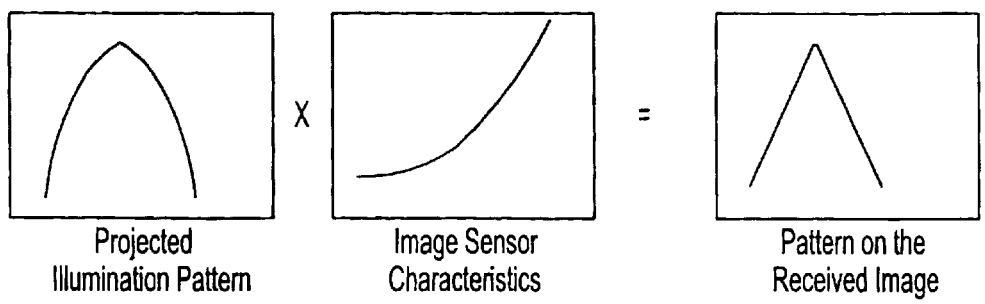

Referring to FIGS. 10*a* and 10*b*, the actual projection pattern appearing on the image received by the camera is the convolution of the projection pattern produced by the light source and the sensitivity characteristics of the image sensor. As shown in the FIG. 10*a*, if an image sensor has a nonlinear sensitivity, a linear projection pattern provided by the light source may be distorted into a nonlinear variation pattern in the received image.

To compensate for any nonlinear characteristics of the camera 102 or other image sensor used in the system, it may be desirable to pre-calibrate the characteristics of the image sensor 102, then apply its inverse function to the desired projection pattern design, resulting in a pre-distorted projection pattern, as shown in FIG. 10*b*. The pre-distortion projection pattern compensates for any non-linearities in the camera or image sensor so that the final pattern on the image captured by the image sensor is ideal and distortion-free.

Figure 11:
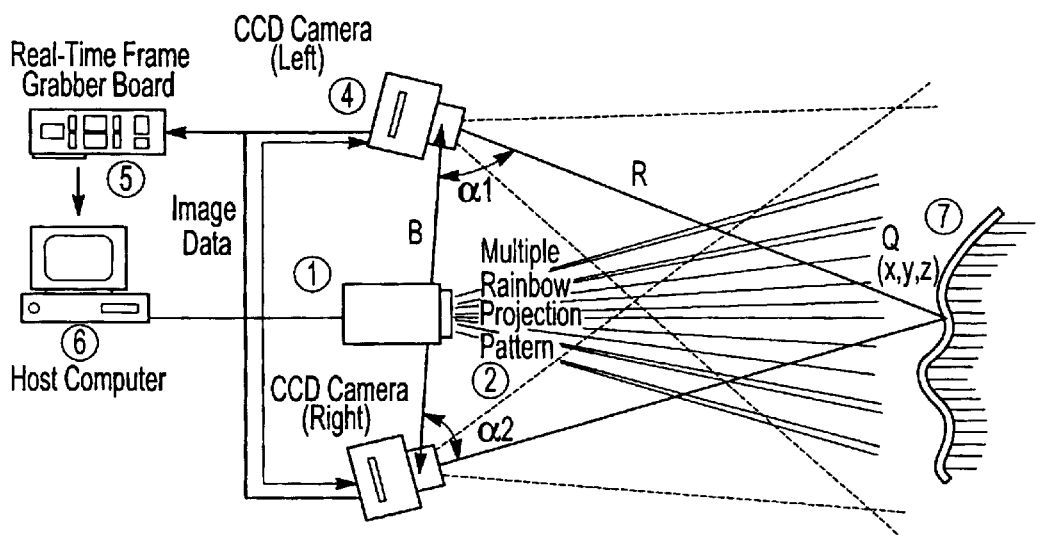
FIG. 11 illustrates another embodiment of the inventive system.

Although all of the above examples assume that there is only one camera or image sensor used to capture images of the illuminated object, multiple cameras can also be used to capture multiple rainbow projection pattern data. Referring to FIG. 11, the light projector, marked ①, generates the multiple rainbow projection patterns, marked ②, to lighten the scene containing 3D objects of interest, marked ⑦. The reflected light is detected by a pair of color CCD cameras, marked ③ and ④. The images, which contain both intensity and color components, will be grabbed by a real time frame grabber board, marked ⑤, into a host computer, marked ⑥, to perform pixel-to-pixel color matching and triangulation calculation, based on the similarity of color patterns and intensity variation in the neighborhood of pixels in stereo image pairs.

The color spectrum of pixels on the captured images is determined by the proportion of Red, Green and Blue components (RGB) associated with the individual pixel. As a result, pixel-to-pixel registration can be easily performed based on matching the color components of counterparts. Because the length of the baseline B between the two cameras is known, and the geometrical and optical parameters of two cameras can be obtained from a prior calibration procedure, the locations of a pair of corresponding pixels in a stereo image pair provide sufficient information to determine viewing angles α1 and α2. The range values, R, associated with each pixel between a camera and surface points can be obtained using a straightforward triangulation:

$$R = B\frac{\sin(\alpha_2)}{\sin(\alpha_1 + \alpha_2)} \quad (11)$$

Thus, a full frame of a three-dimensional image can be obtained from a single snap shot, and a stream of three-dimensional images can be generated at the camera's frame rate (e.g., 30 frames per second or higher).

By using multiple cameras in conjunction with the multiple rainbow projection system, three-dimensional measurement accuracy is greatly improved, particularly when measuring objects and scenes that do not have many distinguishing surface features. More particularly, the stereo matching and triangulation methods used in this embodiment reduces the dependence of distinguishing features, such as edges and corners, on an object's surface in conducting the measurement.

Figure 12A:
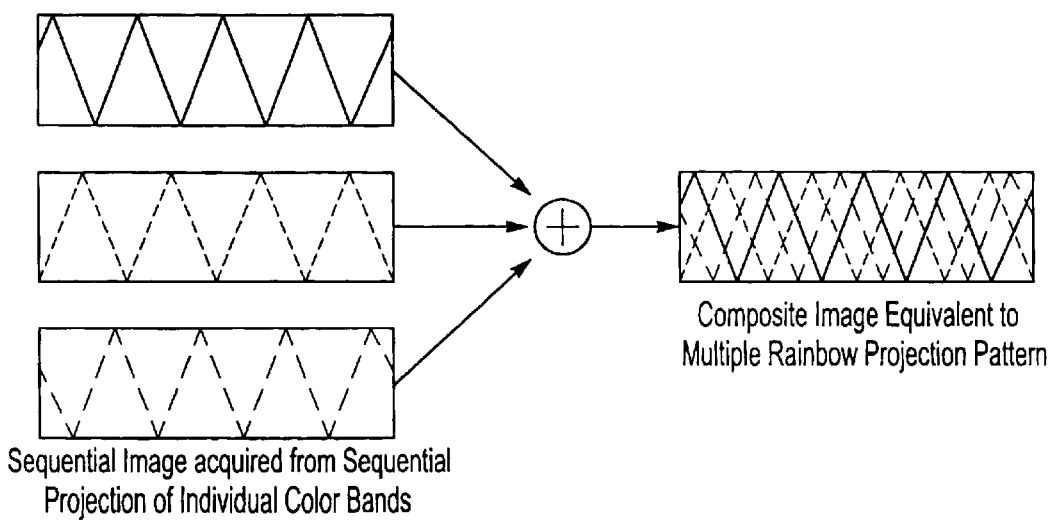
FIGS. 12a and 12b illustrate a light pattern and method that is generated from a composite image of multiple sub-patterns according to another embodiment of the invention.
Figure 12B:
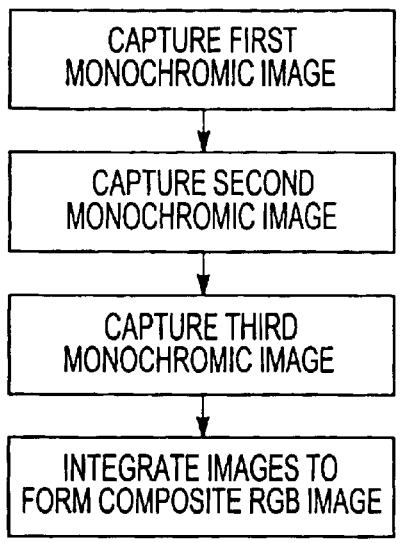

Referring now to FIGS. 12*a* and 12*b*, the inventive system is not limited to systems using a color camera or color images, but can also be implemented using a monochromic camera and monochromic projection patterns. More particularly, a multiple rainbow projection pattern can be represented as a combination of three individual bands of color, namely red, green, and blue (or other colors, if a different color space is defined). Each band of color components (R, G, B) can be projected sequentially so that a monochromic camera can collect the reflected images for each color component upon each projection. These images are then combined to form a composite "color" image, which is equivalent to the color image produced by a color camera under the multiple rainbow projection, as illustrated in FIG. 12*a*. FIG. 12*b* outlines the method corresponding to the sequential images illustrated in FIG. 12*a*. The resulting composite image can be used like any color image and can be captured by systems employing one camera or multiple cameras.

Using a monochromic camera to obtain the color image generates high-resolution images using lower-cost, less complex equipment. However, because multiple images need to be obtained of any given scene to generate a full-frame three-dimensional image, this embodiment is most suitable for acquiring images of static or slowly moving objects.

Note that the above examples assumed that an optical filter is used to produce the illumination pattern, such as a rainbow pattern, on the object or scene being imaged. In this type of system the light from the light source is projected through the optical filter to generate the light pattern. The quality of the light pattern, however, depends greatly on the quality of the optical filter, which can be expensive and difficult to produce.

Figure 13:
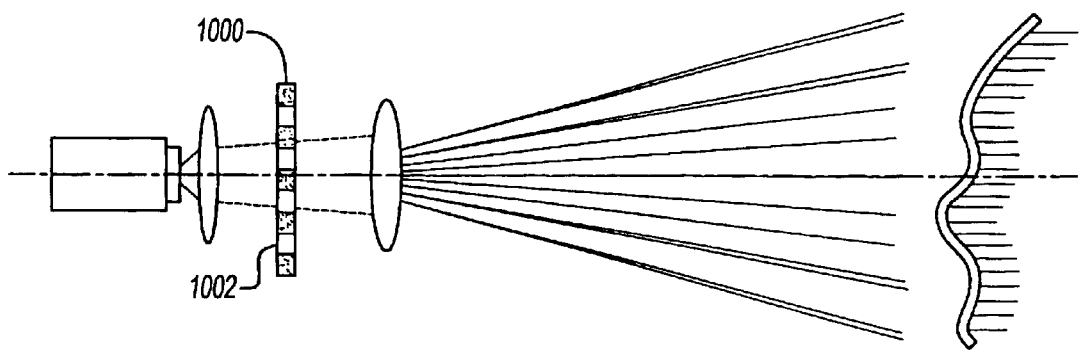
FIG. 13 is a representative diagram of another embodiment of the invention using a slotted plate.
Figure 14:
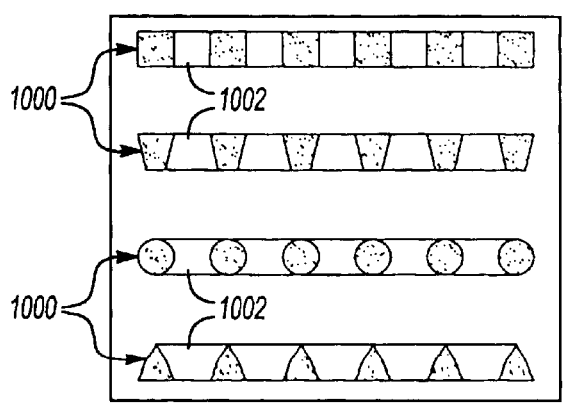
FIG. 14 illustrates examples of cross-sections of the slotted plate used in FIG. 13.

FIGS. 13 through 16*a* and 16*b* illustrate an alternative structure that can create multiple-periods of a light pattern having gradually changing intensities. Instead of using an optical filter, a planar member 1000 with slots 1002 cut through the member to form a slotted plate 1000, as shown in FIGS. 13 and 14, may be used. The slotted plate 1000 can be made of any non-transparent material and have any physical dimensions and any thickness. In a preferred embodiment, the width of each slot 1002 is made to be the same as the width of the material between the slots. Further, as illustrated in FIG. 14, the cross-sectional shape of the slots themselves can have any desired shape and do not need to conform to any specific dimensions. The slotted plate 1002 can be placed in a similar position as the optical filter, in front of the light source so that the light from the source is projected toward the object being imaged through the slotted plate. As a result, a light projector using the slotted plate 1000 is able to generate the desired spatially-varying illumination pattern on objects in a scene with varying light intensity crossing the scene.

Figure 15:
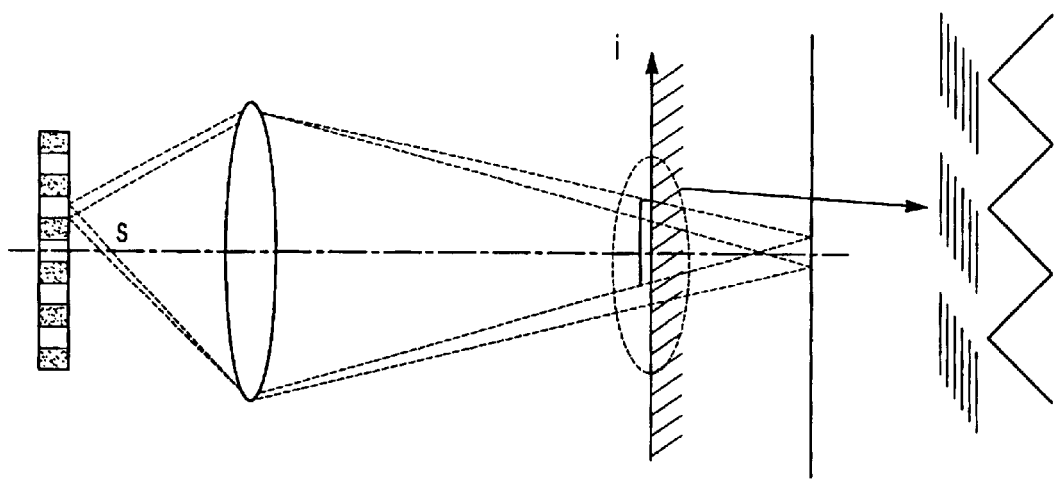
FIG. 15 is an illustrative diagram showing the manner in which the slot plane generates a spatially varying light intensity pattern.

To generate the illumination pattern, assume that the illumination intensity on the surface of an object in a scene can be expressed as a function of the coordinate and the contribution of each point light source. The expression for the intensity then becomes:

$$\text{Intensity} = \int_s I(s, l)\,ds$$

where s is the location of the point light sources element, l is the location on the surface of object, I(s, l) is the illumination intensity on the surface of object at the l location produced by point light source of s. Accumulation of the light illumination from all of the point light sources forms the desired spatially varying illumination intensity on the object's surface at locations that are away from the focal plane of the light projection system, as illustrated in FIG. 15. Shifting the position of the slotted plate 1002 relative to the object surface creates small phase shifts of the illumination intensity pattern to allow triangulation of each point on the object being imaged.

Figure 16A:
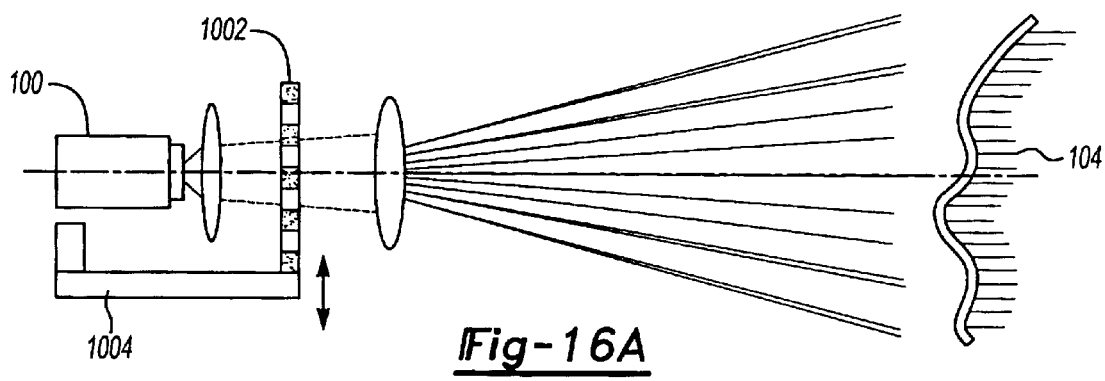
FIGS. 16a and 16b illustrate alternative systems incorporating the slotted plate.
Figure 16B:
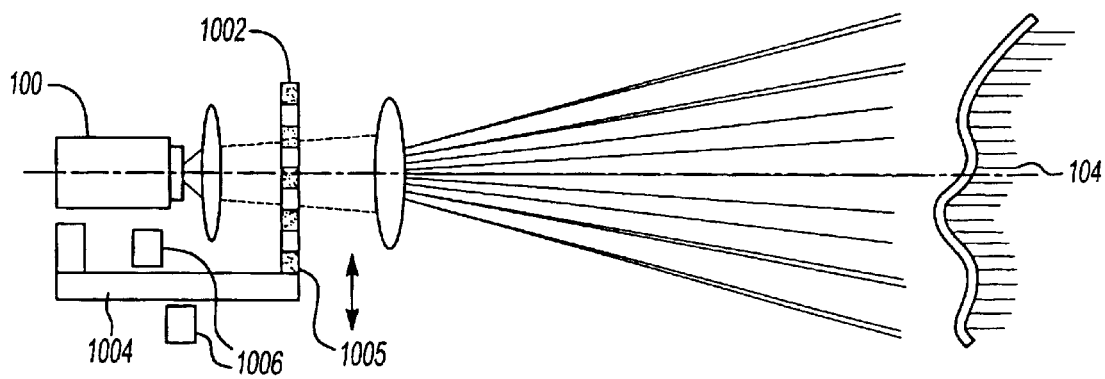

FIGS. 16*a* and 16*b* illustrate two possible structures for shifting the slot plate position to provide phase shifts in the illumination intensity pattern. FIG. 16*a* shows one possible microshifting mechanism using a piece of bimorpher material 1004 to support the slotted plate 1002. Bimorpher materials have the unique property of electrical field induced motion. By fixing one end of the bimorpher support 1004, the other end of the bimorpher support 1004 can be controlled to move transversally by applying DC voltage on the two sides of the bimorpher support 1004. The bimorpher support 1004 can be fixed, for example, on the light source and the slot plate, supported by the bimorpher support 1004, can be controlled to move the slot plate 1002 relative to the position of the light source 100 by applying different electrical fields to the bimorpher support member 1004. Consequently, the zigzag illumination pattern can be shifted. In many application of three-dimensional imaging, the micro-shifting of the slot plate 1002 position can generate sufficient shift of the zigzag waveform to allow for triangulation of each point on the object being imaged 104.

An alternative embodiment, as shown in FIG. 16*b*, of the micro-shift mechanism uses a pair of miniature electromagnetic actuators 1004 and a flexible bar 1005 supporting the slotted plate 1004. More particularly, activation of the actuators 1004 can move the flexible bar 1005, and thereby the slot plate 1002, in transverse directions.

The slotted plate 1002 can be used with, for example, a camera and a single-color light source. In such a case, the monochromatic camera preferably illuminates the object three times with the slotted plate 1002 in a different position each time. These three images are then processed by the system's computer as if they represented the red, green and blue components of a color image. The resulting composite image, while not actually in color, contains variation that can be arbitrarily associated with color. This pseudo-color image is then used by the system to determine the angle at which light left the light source to illuminate each point or pixel on the object being imaged. This method is proceeds in precisely the manner outlined above when, for example, an LVWF is used to provide a rainbow or wavelength varying light pattern on the object being imaged. In other words, after the three images are taken between shifts of the slotted plate, these images being used as red, green and blue components of a composite color image, and a pseudo-color composite image is constructed, three-dimensional ranging can be performed according to any ranging technique such as, for example, the technique described in U.S. Pat. No. 5,675,407, the disclosure of which is incorporated herein by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A device for creating a three-dimensional profile of an object or scene being imaged, the device comprising:
   a light source for illuminating said object or scene with a light pattern, wherein said light pattern has a characteristic that varies across said object or scene and that includes two or more repeated sub-patterns which are arranged sequentially along a single direction across said object or scene;
   an image sensor for imaging said object or scene as illuminated with said light pattern; and
   a processor for calculating a distance to a point on said object or in said scene based on a baseline distance between said light source and said camera, an angle between said camera and said baseline, and an angle at which light striking the point is emitted by said light source as determined from the characteristic of the light striking the point.

2. The device of claim 1, wherein the varying characteristic is a spatially varying wavelength, and wherein two or more sub-patterns are two or more spectra of light in the visible light spectrum such that a given wavelength corresponds to more than one projection angle.

3. The device of claim 2, wherein the processor determines the projection angle for the given wavelength via adaptive initial point calculation, wherein the processor restricts a search space for color matching in one of said sub-patterns.

4. The device of claim 1, wherein the two or more sub-patterns are two or more spectra of light in the infrared light spectrum.

5. The device of claim 1, wherein the two or more sub-patterns are two or more spectra of light in the ultra-violet light spectrum.

6. The device of claim 1, wherein the varying characteristic is a spatially varying intensity, and wherein said two or more light sub-patterns are three light sub-patterns corresponding to red, green and blue components of the light pattern.

7. The device of claim 6, wherein said three light sub-patterns have varying intensities, each sub-pattern having a high point and a low point.

8. The device of claim 7, wherein the high points and low points for the three sub-patterns are distributed over a spatial period of the light pattern.

9. The device of claim 1, wherein the varying characteristic is a spatially varying wavelength, and wherein the device further comprises an optical filter coupled to the light source to generate said light pattern.

10. The device of claim 9, wherein said optical filter is a linear variable wavelength filter.

11. The device of claim 1, wherein the light pattern is pre-distorted based on a pre-calibration characteristic of the image sensor.

12. The device of claim 1, further comprising a second image sensor, wherein said image sensor and said second image sensor together form a stereo pair.

13. The device of claim 1, wherein the varying characteristic is a spatially varying intensity and wherein the image sensor is monochromic and the light source generates the light pattern by sequentially emitting a plurality of light sub-patterns.

14. The device of claim 13, wherein the plurality of light sub-patterns is three light sub-patterns corresponding to red, green and blue components of the light pattern.

15. The device of claim 1, wherein the varying characteristic is a spatially varying intensity and the device further comprises a planar member having a plurality of openings disposed between said light source and said object or scene for generating the light pattern.

16. The device of claim 15, wherein said plurality of openings are slots.

17. The device of claim 15, further comprising a microshifting mechanism coupled to the planar member to generate shifts of the light pattern by moving the planar member, wherein the processor calculates a distance to the point on the object or scene using triangulation based on the shifts of said light pattern.

18. The device of claim 17, wherein the microshifting mechanism includes a support structure coupled to the planar member, wherein the support structure is formed of a bimorpher material that is movable in response to an applied voltage to thereby move the planar member.

19. The device of claim 17, wherein the microshifting mechanism includes a support structure coupled to the planar member and an electromagnetic actuator to move the support structure and thereby move the planar member.

20. A device for creating a three-dimensional profile of an object or scene being imaged, the device comprising:
a light source for illuminating said object or scene with a light pattern, wherein said light pattern has a spatially varying characteristic that varies across said object or scene and includes two or more visible light spectra arranged contiguously with each other along a single direction across said object or scene such that light having a given characteristic is emitted at two or more projection angles;
an image sensor for imaging said object or scene as illuminated with said light pattern; and
a processor for calculating a distance to a point on said object or in said scene based on a baseline distance between said light source and said camera, an angle between said camera and said baseline, and an angle at which light striking the point is emitted by said light source as determined from the given characteristic of the light striking the point.

21. The device of claim 20, wherein the spatially varying characteristic is wavelength, and wherein the processor selects from said two or more projection angles by correlating the point position with one of said two or more visible light spectra.

22. The device of claim 21, wherein the processor determines the projection angle for the given wavelength via adaptive initial point calculation, wherein the processor restricts a search space for color matching in one of said visible light spectra.

23. The device of claim 20, wherein the image sensor is pre-calibrated to generate a pre-distorted projection pattern.

24. The device of claim 20, further comprising a second image sensor, wherein said image sensor and said second image sensor together form a stereo pair.

25. The device of claim 20, wherein the spatially varying characteristic is wavelength, and wherein the device further comprises a planar member having a plurality of openings disposed between said light source and said object or scene for generating the light pattern.

26. The device of claim 25, further comprising a microshifting mechanism coupled to the planar member to generate shifts of the light pattern by moving the planar member, wherein the processor calculates a distance to the point on the object or scene using triangulation based on the shifts of said light pattern.

27. The device of claim 26, wherein the microshifting mechanism includes a support structure coupled to the planar member, wherein the support structure is formed of a bimorpher material that is movable in response to an applied voltage to thereby move the planar member.

28. The device of claim 26, wherein the microshifting mechanism includes a support structure coupled to the planar member and an electromagnetic actuator to move the support structure and thereby move the planar member.

29. A method for creating a three-dimensional profile of an object or scene being imaged, the method comprising the steps of:
illuminating the object or scene with a light pattern, wherein said light pattern has a spatially varying characteristic that varies across said object or scene and includes two or more sub-patterns in which variation of said varying characteristic is at least partially repeated in different sub-patterns along a single direction across said object or scene;
imaging said object or scene as illuminated with said light pattern; and
calculating a distance to a point on said object or in said scene based on a baseline distance between said light source and said camera, an angle between said camera and said baseline, and an angle at which light striking the point is emitted by said light source as determined from the spatially varying characteristic of the light striking the point.

30. The method of claim 29, wherein the spatially varying characteristic is wavelength, and wherein the two or more sub-patterns are two or more spectra of light in the visible light spectrum such that a given wavelength corresponds to more than one projection angle.

31. The method of claim 30, wherein the calculating step includes the step of determining the projection angle for the given wavelength via adaptive initial point calculation by restricting a search space for coloring matching in one of said sub-patterns.

32. The method of claim 29, wherein the spatially varying characteristic is intensity, and wherein the two or more sub-patterns from the illuminating step are three light sub-patterns corresponding to red, green and blue components of the light pattern, and wherein the three light sub-patterns have varying intensities, each sub-pattern having a high point and a low point such that the high points and low points for the three sub-patterns are distributed over a spatial period of the light pattern.

33. The method of claim 29, further comprising the step of pre-distorting the light pattern based on a pre-calibration characteristic of the image sensor.

34. The method of claim 29, wherein the imaging step comprises the step of imaging the illuminated object or scene using at least two image sensors.

35. The method of claim 29, wherein the spatially varying characteristic is intensity, and wherein the illuminating step comprises the step of generating the light pattern by sequentially emitting a plurality of light sub-patterns corresponding to red, green and blue components of the light pattern.

36. The method of claim 29, further comprising the steps of shifting the light and calculating a distance to the point on the object or scene using triangulation based on the shifts of said light pattern.

37. A device for creating a three-dimensional profile of an object or scene being imaged, the device comprising:
a light source for illuminating said object or scene with a light pattern, wherein said light pattern has a characteristic that varies across said object or scene and that includes two or more sub-patterns, wherein bands in said light pattern, within which bands said characteristic does not vary, are aligned in parallel throughout said light pattern including within said sub-patterns;

an image sensor for imaging said object or scene as illuminated with said light pattern; and a processor for calculating a distance to a point on said object or in said scene based on a baseline distance between said light source and said camera, an angle between said camera and said baseline, and an angle at which light striking the point is emitted by said light source as determined from the characteristic of the light striking the point.

38. The device of claim 37, wherein the varying characteristic is a spatially varying wavelength, and wherein two or more sub-patterns are two or more spectra of light in the visible light spectrum such that a given wavelength corresponds to more than one projection angle.

39. The device of claim 38, wherein the processor determines the projection angle for the given wavelength via adaptive initial point calculation, wherein the processor restricts a search space for color matching in one of said sub-patterns.

40. The device of claim 37, wherein the varying characteristic is a spatially varying intensity, and wherein said two or more sub-patterns are three light sub-patterns corresponding to red, green and blue components of the light pattern.

41. The device of claim 37, wherein the varying characteristic is a spatially varying wavelength, and wherein the device further comprises an optical filter coupled to the light source to generate said light pattern.

42. The device of claim 41, wherein said optical filter is a linear variable wavelength filter.

43. The device of claim 37, further comprising a second image sensor, wherein said image sensor and said second image sensor together form a stereo pair.

* * * * *